United States Patent

[11] 3,587,651

| [72] | Inventors | William E. McCollough<br>Detroit;<br>Ronald E. Herman, Warren, Mich. |
|---|---|---|
| [21] | Appl. No. | 786,033 |
| [22] | Filed | Dec. 23, 1968 |
| [45] | Patented | June 28, 1971 |
| [73] | Assignee | Holley Carburetor Company<br>Warren, Mich. |

[54] MULTISTAGE POWER VALVE ASSEMBLY
4 Claims, 1 Drawing Fig.

[52] U.S. Cl. .................................................. 137/628,
123/103
[51] Int. Cl. ...................................................... F16k 11/14
[50] Field of Search............................................ 137/628,
630.19

[56] References Cited
UNITED STATES PATENTS

| 2,061,166 | 11/1936 | Mueller...................... | 137/630.19X |
| 2,228,198 | 1/1941 | Cerny......................... | 137/630.19X |
| 2,358,634 | 9/1944 | Good.......................... | 137/630.19X |
| 2,599,997 | 6/1952 | Iannelli....................... | 137/630.19 |
| 2,671,465 | 3/1954 | Alsina........................ | 137/630.19X |
| 2,699,958 | 1/1955 | Beach......................... | 137/628X |
| 2,975,804 | 3/1961 | Dunn.......................... | 137/628X |

*Primary Examiner*—Clarence R. Gordon
*Attorney*—Walter Potoroka, Sr.

ABSTRACT: A power valve assembly has a housing portion with first and second passages formed therein respectively containing first and second spring-loaded valve members for controlling the flow of fuel therethrough; a lever member is effective upon actuation to sequentially engage the first and second valve members so as to affect staged opening thereof.

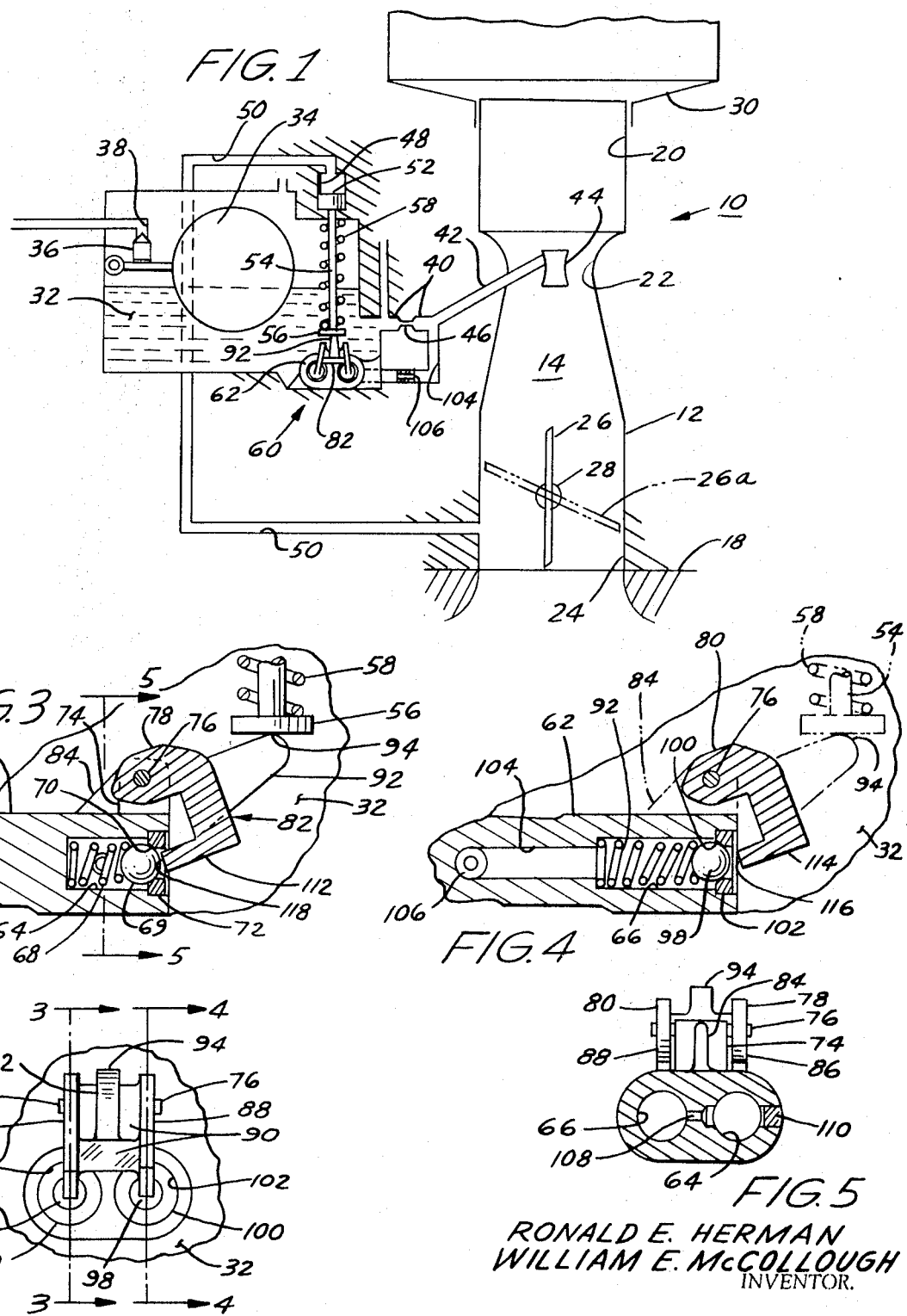

MULTISTAGE POWER VALVE ASSEMBLY

BACKGROUND OF THE INVENTION

It has been accepted practice to provide, in carburetor structures, a power fuel enrichment system comprised of a power valve assembly carried by the carburetor in a manner so as to be affected by engine manifold vacuum. The manifold vacuum acting on a movable pressure responsive member, which is adapted for operative engagement with the valving means of the power valve assembly, at idle or normal load conditions, as well as during engine deceleration, is strong enough to overcome a spring resistance so as to maintain the valving means closed. When high power demands place a greater load on the engine and manifold vacuum drops below a predetermined value, the said spring overcomes the reduced vacuum thereby opening the valving means. Consequently, fuel flows through the open valve means and ultimately into the carburetor induction passage thereby enriching the otherwise normal fuel-air mixture. As engine demands are reduced manifold vacuum again increases. The increased vacuum acts on the pressure responsive member to finally overcome the resistance of the said spring thereby closing the valving means and shutting off the added supply of fuel which is no longer required.

The prior art has also suggested that such power valve assemblies be constructed so as to provide such additional fuel in stages instead of providing a single increased rate of fuel flow in order to thereby more closely tailor the increase in fuel flow to the requirements of the engine.

However, heretofore such multistage power valve assemblies have not been entirely successful because of certain undesirable characteristics. For example, the multistage power valve assemblies of the prior art have employed serially positioned valving members each of which coacted with serially situated valve seats. Usually such valve members were not positively guided during their movements toward and away from the valve seats thereby often creating a cocked position of the valve with respect to the seat.

Further, such serially situated valves and springs often present difficulties in trying to vary the calibration of such power valve assemblies as might be required when such are to be applied to different engines of varying operating characteristics.

Accordingly, the invention herein disclosed and claimed directs itself to the solution of such problems as set out above including others which will become apparent.

SUMMARY OF THE INVENTION

According to the invention, a multistage power valve assembly comprises a first valve assembly and a second valve assembly separated from each other and individually controlling the flow of enrichening fuel therethrough to cooperating conduit means, and actuating means for sequentially abuttably engaging said first and second valve assemblies in order to achieve staged incremental increases in enrichening fuel flow.

Accordingly, a general object of this invention is to provide a power valve assembly which is capable of providing staged incremental increases in fuel flow therethrough.

A further object of this invention is to provide a power valve assembly which is comprised of a plurality of valve assemblies separated from each other in a manner so as to be sequentially engageable by a single actuating member positioned in response to and in accordance with engine manifold vacuum.

Other objects and advantages of the invention will become apparent when reference is made to the following detailed description considered in conjunction with the accompanying drawings.

DESCRIPTION OF THE DRAWINGS

In the drawings, wherein certain details may be omitted from one or more views for purposes of clarity:

FIG. 1 is a diagrammatic view of a carburetor and the fuel system thereof showing, on somewhat an enlarged scale, the power valve assembly of the present invention incorporated therein;

FIG. 2 is an enlarged view of a fragmentary portion of the structure shown in FIG. 1;

FIG. 3 is a cross-sectional view taken generally on the plane of line 3-3 of FIG. 2 and looking in the direction of the arrows;

FIG. 4 is a cross-sectional view taken generally on the plane of line 4-4 of FIG. 2 and looking in the direction of the arrows; and FIG. 5 is a transverse cross-sectional view taken generally on the plane of line 5-5 of FIG. 3 and looking in the direction of the arrows.

DESCRIPTION OF PREFERRED EMBODIMENT

Referring now in greater detail to the drawings, FIG. 1 diagrammatically illustrates a carburetor 10 having a body 12 with an induction passage 14 formed therethrough communicating with the passageway 16 of the intake manifold 18, of an associated internal combustion engine, upon which the carburetor 10 is mounted. The induction passage 14 may be comprised of an air inlet 20, a main venturi 22 and a mixture outlet 24 in communication with manifold passageway 16. The flow through the induction passage 14 may be controlled by a throttle valve 26 mounted on a throttle shaft 28 for pivotal rotation therewith so as to be variable positioned as by manual operation thereof. Usually an air cleaner, such as is indicated fragmentarily at 30, is connected to the air inlet.

Fuel is supplied to the induction passage 14 from a reservoir 32, which in the example shown is a float chamber of a fuel bowl having a float 34 therein which actuates a fuel valve 36 controlling a fuel inlet 38 leading from any suitable source of supply.

The fuel flows from reservoir or fuel bowl 32 through a conduit 40 to the main fuel nozzle 42 which discharges at the throat of the main venturi 22. A second venturi 44 may be provided to form a discharge member for the main nozzle. A metering restriction 46 is provided in conduit means 40, as is the usual practice, and an idling fuel passage (not shown) of any suitable construction, may lead from the conduit means 40 to discharge adjacent the edge of the throttle valve 26 when in its closed position as shown in phantom lines at 26a. Suitable acceleration pump mechanism, as well as check valves, vents and metering orifices may be provided, as is well known in the art.

The power valve or economizer assembly actuating mechanism comprises a cylinder 48 connected as by a duct or conduit 50 to the induction passage 14 of the carburetor 10 posterior to the throttle valve 26 when the throttle valve is in its closed position. A piston 52 within cylinder 48 is thusly subjected to the manifold vacuum which tends to move it upwardly. A push rod 54, fixed at one end to piston 52, depends downwardly therefrom terminating in a shoe 56 which acts as a seat for a compression spring 58 which, in turn, yieldingly urges the shoe 56 and piston 52 downwardly against the force of the manifold vacuum.

As shown in FIG. 1 as well as in FIGS. 2—5, a multistage power valve or economizer assembly 60 is carried within or formed in the structure generally defining the reservoir 32. Referring in greater detail to FIGS. 2—5, it can be seen that power valve assembly 60 is comprised generally of a housing portion 62 having formed therein first and second chambers or passageways 64 and 66. As is shown in FIG. 3, chamber 64 contains a compression spring 68 resiliently urging a ball valve member 69 against a cooperating valve seat 70 which may be sealingly pressed into a counterbore 72 formed in the housing 62. Housing portion 62 has an upwardly extending support 74 formed thereon which serves as a support for a pivot pin 76 extending therethrough and having its ends pivotally engaging spaced pivot arms 78 and 80 of an actuating lever member 82. As shown in both FIGS. 3 and 5, the upstanding support 74 may also include a gussetlike reinforcing rib 84.

Lever member 82, as also shown in FIG. 2, is comprised of spaced arms 86 and 88 which are joined by an intermediate bridginglike portion 90 which also serves to carry an outwardly extending actuating lever arm portion 92 adapted to have the free end 94 thereof in the normal path of travel of shoe 56 so as to be at times abuttingly engaged thereby.

FIG. 4 illustrates the conduit or chamber 66 as containing a compression spring 96 resiliently urging a ball valve seat 100 which may be sealingly pressed into a counterbore 102 formed in housing section 62. Chamber or passageway 66 is in communication with a discharge conduit 104 which, as also shown in FIG. 1, contains a metering restriction 106 therein. Conduit 104, at its other end, communicates with the main nozzle conduit 42 at a point downstream of mean metering restriction 46.

As shown in both FIGS. 3 and 5, chambers or passageways 66 and 64 are interconnected by a conduit 108 of calibrated cross-sectional area so as to afford restriction means between chambers 64 and 66. Conduit 108 may be formed as by drilling from the side and then closing the outer aperture with a plug 110.

Arms 86 and 88 are also respectively provided with abutment portions 112 and 114. The abutment portions 112 and 114 are of different effective length so as to have end surface 116 of abutment portion 114 disposed a predetermined distance away from ball valve 98 when end surface 118 of abutment portion 112 is in abutting engagement with ball valve 69. As will become evident, when shoe 56 is brought down into contact with lever arm 92 and causes clockwise rotation of lever member 82, abutment portion 112 causes ball valve 69 to be first unseated. If shoe 56 is not moved downwardly an additional distance sufficient to cause the subsequent opening of valve member 98 by abutment portion 114, fuel will flow only between ball valve 69 and seat 70.

OPERATION

Generally, it is well known in the art that the value of manifold vacuum generated by the engine will vary depending on such factors as engine speed, road load and throttle valve position. For example, with the engine operating at idle, a relatively high value of manifold vacuum will be generated because, at such time, the throttle valve 26 is in its nominally closed position illustrated in phantom line at 26a. During such time, as is well known in the art, the principal means for supplying fuel to the induction passage 14 and intake manifold 16 is by suitable conduitry and metering means collectively referred to as the idle fuel system. Such idle fuel systems are well known in the art, and, for purposes of clarity, are not illustrated herein since the practice of the invention is not in any way limited to or by an associated idle fuel system. During such idle engine operation the manifold vacuum may be of a value in the order of 16.0 to 19.0 inches of mercury (Hg.).

As the vehicle is started into motion by the movement of the throttle valve 26 (in the clockwise direction in FIG. 1) in the opening direction, the load placed on the engine increases and because of the throttle valve 26 being moved toward a more fully opened position the value of the manifold vacuum decreases. The amount of decrease will depend on the load placed on the engine as well as the rapidity with which the throttle valve 26 is rotated from its nominally closed position toward a more fully opened position. If the engine load is sufficiently great and the opening movement of the throttle is sufficiently rapid, the manifold vacuum may, during this time, decrease to a value in the order of 1.0 to 4.0 inches Hg.

Further, when the vehicle is decelerating with the throttle valve nominally closed and the vehicle driving the engine, the value of the generated manifold vacuum may well substantially exceed that established at idle engine operation and be in the order of 21.0 to 22.0 inches Hg.

Accordingly, it can be seen that manifold or engine-generated vacuum is related to engine operation and as such may be employed as not only an actuating force but also as a control parameter for related devices. Further, it can be seen that cylinder 48 and one side of piston 52 will be exposed to manifold vacuum of a varying value, depending upon throttle position and engine load, by virtue of the communication established by conduit 50.

The main fuel system, for example comprising restriction 46, conduit 40 and main nozzle 42 serves to supply fuel to the induction passage 14 generally during normal off-idle engine operation, as is well known in the art. Further, the manifold vacuum acting on piston 52 at conditions of idle, normal load conditions or deceleration is sufficient to overcome the force of spring 58 thereby holding shoe member 56 off plunger 116. However, when demands for higher power place a greater load on the engine and manifold vacuum decreases below a predetermined value, spring 58 overcomes the pressure differential across piston 52 and moves rod 54 and shoe 56 downwardly against lever arm 92 of value actuating lever member 82 sufficiently to unseat valve members 69 and 98 thereby enabling fuel to flow out of reservoir 32 through conduits 64, 108 and 66 and through discharge conduit 104 to main fuel nozzle passage 42. The rate of fuel flow from the fuel bowl chamber or reservoir 32 to main well or conduit 42 thusly being increased by the opening of the power valve assembly 60 causes an enrichment of the flow through the main discharge nozzle 42 resulting in, of course, the ultimate enrichment of the fuel-air mixture being supplied to the induction passage 14 and intake manifold passageway 16. As engine power demands are reduced, manifold vacuum increases; when the vacuum has sufficiently increased, the pressure differential created across piston 52 overcomes the force of spring 58 and again permits valves 69 and 98 to be closed against their respective seats 70 and 100 terminating the flow of fuel therethrough. This results in the rate of fuel flow being again controlled primarily by the effects of restriction 46.

The preceding is, of course, a general statement of the overall operation of the main fuel metering system and the correlated operation of the power valve assembly in the fuel enrichment system. However, the following is a more detailed description of the fuel enrichment system, especially the power valve assembly 60 of the invention.

In view of the preceding it is of course apparent that rod 54 and shoe 56 will not always move downwardly to their maximum stroke position. That is, the distance of downward movement of rod 54 and shoe 56 will depend on the value of manifold vacuum, the preload as well as the spring rate of compression spring 58 and the preloads and spring rates of both springs 68 and 96 of power valve assembly 60.

Accordingly, the action of power valve assembly 60 can best be appreciated if its operation is considered relative to incremental changes in the value of manifold vacuum. For example, when a predetermined value of manifold vacuum is experienced by piston 52, rod 54 and shoe 56 will have moved, because of spring 58, to a position of abutting engagement with the upper free end 94 of lever arm 92 of the actuating lever member 82, as shown in both FIGS. 3 and 4. A further reduction in the value of manifold vacuum causes a progressive further downward movement of rod 54, shoe 56 and the clockwise rotation of lever member 82 by its lever arm 92 which, in turn, causes the lever abutment portion 112 to unseat valve member 69 from its seat 70. Such further downward movement of rod 54 and the opening of valve member 69 is not initially accompanied by a corresponding opening movement of the second stage valve member 98 because of the relative distance between secondary valve member 98 and abutment surface 116 of lever 88 when abutment surface 118 of lever 86 is in abutting engagement with primary valve member 69. It is this relative distance which permits secondary valve 98 to remain seated while the primary valve 69 is undergoing opening movement.

As primary valve 69 is thusly opened, fuel from reservoir 32 flows between valve 69 and seat 70 into conduit 64 from where it flows through restricted or calibrated conduit 108 into chamber or passageway 66. The fuel then flows through discharge conduit 104 and into main nozzle conduit 42 from where it is discharged into the induction passage 14 of the carburetor 10. At this time the secondary valve 98 is held closed against its seat 100 by spring 96. Accordingly, all of the enrichening fuel is supplied by virtue of the opened primary valve 69. It should be mentioned that during this time, orifice or calibrated passageway 108 functions as a metering restriction. That is, the flow through the primary restriction 108 is such as to be less than that rate of flow at which restriction 106 will exhibit any substantial metering function. While there could be more than one such restriction 108, a single restriction is preferred so as to eliminate duplication of orifice sizing.

The downward movement of rod 54 and shoe 56 will continue, with accompanying decreasing values of manifold vacuum, until such time as the lever member 82 is rotated sufficiently to cause abutment surface 116 of lever abutment portion 114 to abuttingly engage secondary valve 98. After such abutting engagement is achieved, further reductions in the value of manifold vacuum is accompanied by rod 54 causing additional rotation of lever member 82 thereby moving secondary valve 98 away from its seat 100.

During this time, fuel, in addition to that flowing through chamber 64 and restriction 108, is admitted into chamber 66 directly past the opened secondary valve 98. The total quantity of fuel then flows through discharge conduit 104, metering restriction 106 and into main well or nozzle conduit 42 so as to be discharged into the induction passage 14. As previously indicated, restriction 106 is provided within the conduit means 104 so as to thereby provide a metering function to the fuel flowing therethrough when both primary and secondary valves 69 and 98, respectively, are opened. The restriction 106, of course, then tailors the rate of additional fuel flow to the requirements of the particular engine with which the carburetor and power valve assembly are associated.

In view of the preceding it should be apparent that the power valve assembly of the invention provides a structure whereby the rate of additional fuel flow to the engine, in order to enrich the fuel-air mixture in the induction passage 14, is applied in stages so that the rate of such additional fuel flow is more nearly the exact quantity of additional fuel which is required for that particular condition of engine operation.

Although only one preferred embodiment of the invention has been disclosed and described, it is apparent that other embodiments and modifications of the invention are possible within the scope of the appended claims.

We claim:

1. A multistage power valve assembly, comprising a housing, first and second bores formed in said housing, a first inlet formed in said housing communicating with said first bore, a second inlet formed in said housing communicating with said second bore, outlet conduit means formed in said housing and communicating with said second bore, first normally closed valve means situated within said first inlet, second normally closed valve means situated within said second inlet, and actuating means for at times operatively engaging said first valve means and said second valve means in order to cause sequential actuation thereof so as to cause said first valve means to become opened first and said second valve means to become opened after said first valve means is opened, said first and second valve means when opened permitting fluid flow through said first and second inlets respectively, said first normally closed valve means comprising a first cooperating valve and valve seat, said second normally closed valve means comprising a second cooperating valve and valve seat, first resilient means situated within said first bore for normally urging said first valve closed against said first valve seat, a second resilient meant situated within said second bore for normally urging said second valve closed against said second valve seat, calibrated metering restriction means carried within said outlet conduit means to meter flow when both of said valves are open, and additional conduit means interconnecting said first and second bores, said additional conduit means comprising second calibrated metering restriction means for metering the rate of fluid flow from said first bore to said second bore when only said first valve is open.

2. A multistage power valve assembly according to claim 1 wherein said first valve seat comprises a first annular seat member with a first centrally disposed passage means formed therethrough for the flow of fluid therethrough whenever said first valve is moved away from said seat member, wherein said first valve comprises a ball-type valve member, wherein said second valve seat comprises a second annular seat member with a second centrally disposed passage means formed therethrough for the flow of fluid therethrough whenever said second valve is moved away from said second annular seat member, wherein said second valve comprises a second ball-type valve member, and wherein said actuating means comprises first and second abutment portions adapted to be at times freely accepted through said first and second passage means in order to thereby at times respectively abuttably engage said first and second ball-type valve members and move said ball-type valve members respectively away from said first and second annular seat members.

3. A multistage power valve assembly according to claim 2 wherein said actuating means comprises a lever member carrying said first and second abutment portions as parts of arm portions of said lever member swingable therewith, and wherein said first and second abutment portions are respectively provided with first and second abutment surfaces for engaging said first and second ball valve members, and means for pivotally securing said lever member to said housing portion.

4. A multistage power valve assembly according to claim 3 wherein said first and second abutment surfaces are formed so as to be generally stepped with respect to each other thereby enabling said first abutment surface to engage and move said first ball valve member away from said first annular seat member before said second abutment surface engages and moves said second ball valve member away from said second annular seat member.